United States Patent [19]
Gold et al.

[11] Patent Number: 4,770,125
[45] Date of Patent: Sep. 13, 1988

[54] SPRING-BIASED DISPENSER MECHANISM FOR MANUALLY OPERATED ANIMAL FOOD DISPENSING MACHINE

[75] Inventors: Arthur Gold; John T. Magdars, both of Northbrook; Burton L. Siegal, Skokie, all of Ill.

[73] Assignee: Carousel Industries, Inc., Morton Grove, Ill.

[21] Appl. No.: 31,863

[22] Filed: Mar. 30, 1987

[51] Int. Cl.$^4$ .................................. A01K 5/00
[52] U.S. Cl. ..................... 119/53.5; 119/56 R; 222/339; 222/410
[58] Field of Search ................. 119/53.5, 54, 56 R; 222/322, 328, 339, 342, 367

[56] References Cited

U.S. PATENT DOCUMENTS

| | | | |
|---|---|---|---|
| 1,728,526 | 9/1929 | Brunhoff | 222/339 X |
| 2,064,719 | 12/1936 | Baldwin | 222/339 |
| 2,243,335 | 5/1941 | Elliott | 222/328 X |
| 2,740,562 | 4/1956 | Bello | 222/410 |
| 4,019,660 | 4/1977 | Berkey | 222/339 X |

Primary Examiner—Robert P. Swiatek
Attorney, Agent, or Firm—Silverman, Cass, Singer & Winburn, Ltd.

[57] ABSTRACT

A granular food dispensing machine capable of being operated by a domestic animal and having a housing with a faceplate and a discharge chute having an entrance adjacent to the interior of the faceplate, and a food supply reservoir mounted upon the housing to create a gravity flow of food into the chute is provided with a metering device for controlling the flow of food into the chute. The metering device has a hopper portion coextensive with the chute entrance and mounted to the faceplate interior at the entrance for axial rotation between a first holding position and a second discharge position. A spring-biased, animal-operated reciprocating actuator is engaged to the hopper through the faceplate to control the amount of food which is discharged.

13 Claims, 1 Drawing Sheet

U.S. Patent   Sep. 13, 1988   4,770,125
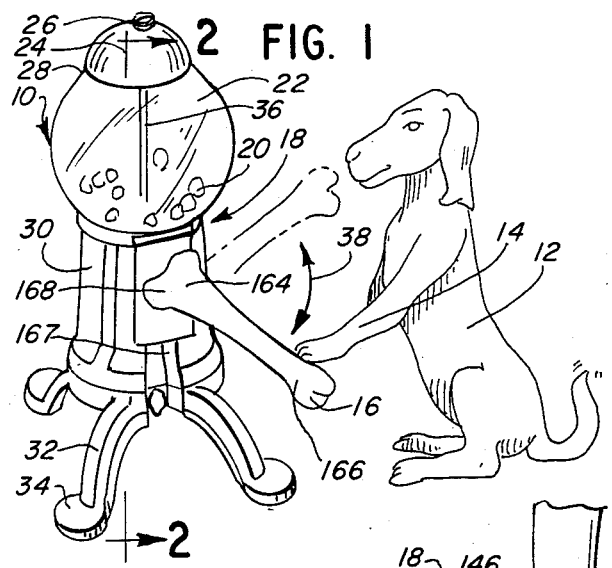
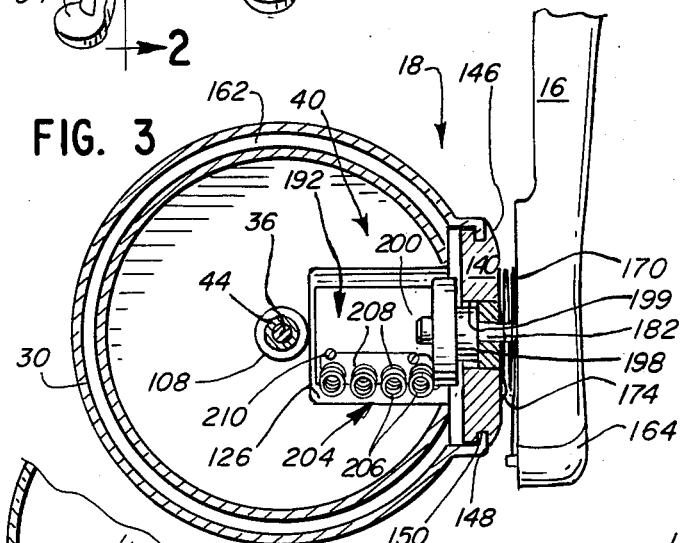
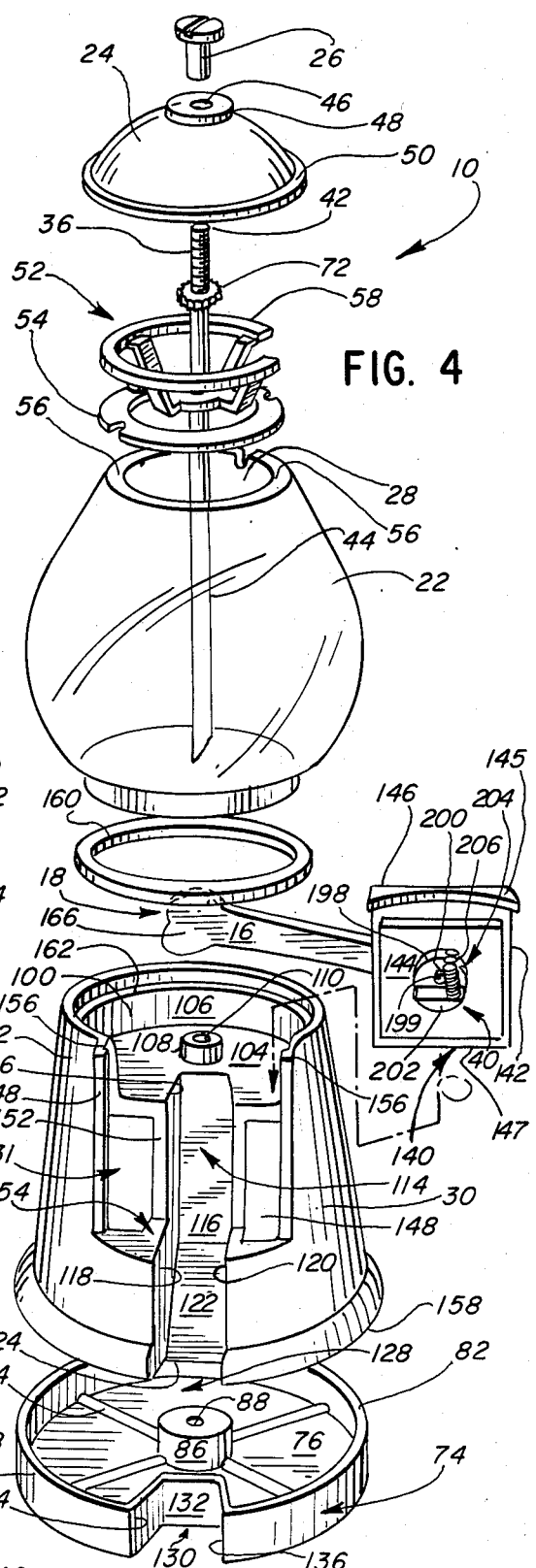
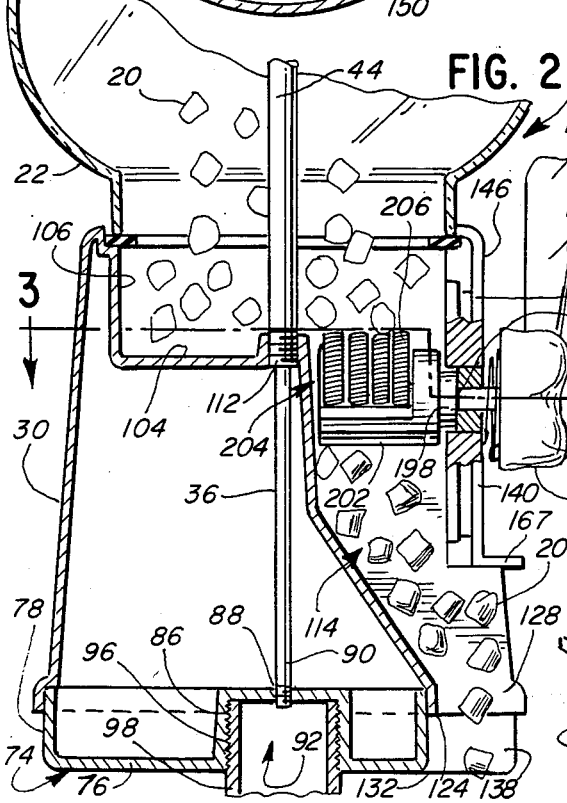

SPRING-BIASED DISPENSER MECHANISM FOR MANUALLY OPERATED ANIMAL FOOD DISPENSING MACHINE

BACKGROUND OF THE INVENTION

This invention relates generally to manually operable vending machines for dispensing granular food products, such as the familiar coin-operated gumball, candy or peanut vending machines. More particularly, the invention provides a unique machine for dispensing food in granular form which can be operated by a domesticated animal or pet, such as a dog or a cat.

Food vending machines of the coin-operated type generally include a food container globe of glass seated on a rigid base or housing in which the mechanism for dispensing the food is installed. The housing is supported on a base plate which closes off the bottom open end of the housing. An elongated support rod or standard extends from the base plate through the housing, the dispensing mechanism, and the food container globe into engagement with a cap which can be tightened on the globe by means of a screw plug or other suitable fastener. Operably engaged with the internal dispensing mechanism is an external, manually operable actuator, such as a handle or lever, for actuating the internal mechanism to release the food to be dispensed from the globe into an internal chute and out through a discharge opening in the housing.

Such a conventional vending machine can require insertion of a coin into a slot in the faceplate of the machine for engaging the external actuator with the internal dispensing mechanism so that food can be dispensed. Non-coin operated machines also are known. However, both in the case of a coin or a non-coin operated machine of this type, manipulation of the external actuator requires both appreciable torque and human manipulative skill in order to activate the dispensing mechanism for discharging food from the machine. Clearly, if a coin-operated machine is to be operated, human skill to insert the coin into the coin slot is required.

The machine embodying the invention is constructed to permit a domesticated animal or pet, such as a dog or a cat, to selectively manipulate the external actuator means to obtain food from the machine. This machine is provided with an external actuator and an internal dispensing mechanism specially adapted to be activated by the domesticated animal for discharging animal food product in granular or particle form. The actuating means is movable through an arc of rotation between a first and second position in which the first position prevents discharge of food product and the second position enables a metered quantity of animal food to be discharged.

SUMMARY OF THE INVENTION

A manually-operated food dispensing machine designed to be operated by a domestic animal. The machine includes a housing with a discharge chute having an entrance, a faceplate having an interior, an exterior and a central bore, and a food storage reservoir seated upon the housing and retaining a supply of granular food which is fed by gravity into the housing and discharged through the chute. A novel food metering device is provided including a hopper coextensive with the chute entrance and mounted to the faceplate interior for axial rotation in the chute entrance between a first holding position and a second food discharge position. The rotation of the hopper is controlled by a cantilevered, reciprocating actuator lever which engages the hopper through the faceplate. The actuator is designed to be operated by a domestic animal such as a dog or cat to be movable between two selected positions of which one position prevents food discharge and the second position enables a metered quantity of food product to be dispensed from the machine.

BRIEF DESCRIPTION OF THE DRAWINGS

FIG. 1 is a perspective view of a conventional food dispensing machine provided with a spring-biased dispenser mechanism embodying the invention installed therein and showing a domesticated animal positioned with its paw engaging the actuator;

FIG. 2 is a fragmentary sectional view illustrating one embodiment of the present invention taken through the machine along the line 2—2 of FIG. 1 in the direction indicated generally;

FIG. 3 is a sectional view illustrating a second embodiment of the present invention as it would appear taken through the base or housing of the machine along the line 3—3 of FIG. 2 and in the direction indicated generally;

FIG. 4 is an exploded perspective of the machine in FIG. 1 with its faceplate and associated actuator rotated 180° and displaced from the housing or base; and FIG. 5 is an exploded view of the actuator and faceplate of the present invention.

DESCRIPTION OF THE PREFERRED EMBODIMENTS

Referring to FIG. 1 a conventional animal food dispensing machine embodying the spring-biased dispenser mechansim of the invention is designated generally by the reference numeral 10. Positioned alongside the machine 10 is an animal 12 illustrated as a dog for descriptive purposes. The animal 12 has one paw 14 elevated to engage a lever 16 of an external actuator 18. Animal food particles 20 are shown stored in a globe-shaped storage container 2 until needed. The food storage container 22 can be fabricated of any suitable material, such as glass or synthetic plastic and its shape also may vary from that illustrated. To replenish the supply of the animal food 20 in the container 22, the cap 24 can be removed by withdrawing screw plug 26 to expose the open upper end 28 of globe 22.

The food storage container 22 rests on a housing 30. The housing 30 need not have a specific shape or be made of a specific material. However a heavy material, such as cast iron or die cast zinc, is preferred to assure strength and long life for the machine. A plurality of legs 32 and corresponding feet 34 are provided to further stabilize the machine 10. The legs 32 and feet 34 are not restricted to a specific shape or material and can, in fact, be eliminated altogether without departing from the present invention.

An elongated support rod 36 extends vertically from the housing 30 through the food storage container 22 and is engaged with the screw plug 26 to assemble the machine 10 into a single unit. When the animal 12 wishes a quantity of the food 20 to be dispensed, the animal can engage the lever 16 of the external actuator 18 to rotate the actuator 18 clockwise in the arcuate direction of arrow 38 to dispense food 20 to the exterior of the machine 10.

Referring to FIG. 4, the machine 10 is illustrated in further detail showing the spring-biased dispenser mechanism of the invention that is collectively designated 40. The support rod 36 is seen to have a threaded end 42 and is inserted within a threaded cover sleeve 44. The screw plug 26 can pass through an opening 46 in a cap boss 48 to engage the threaded end 42 and secure the cap 24 such that a rim 50 of the cap 24 rests on the alignment apparatus 52.

The alignment apparatus, collectively designated 52, is designed to retain the food storage container 22 and the cap 24 in alignment such that when the cap 24 is tightened on the threaded support rod 36 by means of the screw plug 26, the resulting stress on the food storage container 22 is minimized to prevent breakage. The alignment apparatus 52 is shown having a protective elastomeric gasket 54 that rests on a top edge 56 of the food storage container 22. A spider 58 is provided to align the cap 24 with the food storage container 22. The alignment means 52 is described in further detail in copending application Ser. No. 804,442, and incorporated herein by reference. A thumb nut 72 is then tightened on the threaded cover sleeve 44 to prevent vertical displacement of the alignment means 52.

The housing 30 is illustrated in FIG. 4 with a base 74 sans legs 32 and feet 34 shown in FIG. 1. The base 74 has a relatively flat floor 76 and an annular wall 78 having perimeter edge 82 which extends upwardly from the floor 76 of the base 74. A plurality of support ribs 84 extend from a central boss 86 to the annular wall 78 to lend rigidity to the base 74. As seen in FIGS. 2 and 4, the central boss 86 has a threaded recess 88 to engage a lower end 90 of the threaded rod 36. The central boss 86 can provide an internally threaded passageway 92 at its opposite end to enable the machine 10 to be mounted on threaded end 96 of a standard 98 as illustrated partially in FIG. 2. Referring again to FIG. 4, a cavity 100 is defined within an upper portion 102 of the housing 30. The cavity 100 is defined by a platform 104 and a sidewall 106. An upstanding boss 108 is located on the platform 104. The boss 108 forms a threaded passage 110 to engage a lower end 112 of the threaded cover sleeve 44 (best seen in FIG. 2).

In FIG. 4, the housing 30 has a discharge chute 114 having a rear wall 116 and a pair of sidewalls 118 and 120. A sloped or inclined wall 122 extends from the rear wall 116 to terminate at a lower edge 124. The discharge chute 114 further has an entrance 126 such that the food 20 entering the discharge chute 114 at the entrance 126, is guided along the discharge chute 114 by the walls 116, 118, 120, and 122 to the lower edge 124 where the food 20 then exits the discharge chute 114 through an exit port 128 (best seen in FIG. 2). As seen in FIG. 4, the base 74 further defines a recess 130 having a rear wall 132 and sidewalls 134 and 136 wherein the recess 130 may complement and extend the exit port 128 to form an exit 138 through which the food 20 exits the machine 10. In the alternative, housing 30 can be provided with a lip which forms an exit (not shown) which bypasses the exit 138.

In FIG. 4, the actuator 18 is shown displaced from the housing 30 and rotated 180°. The actuator 18 and the dispenser mechanism 40 are mounted to a faceplate 140, which is provided with lateral edges 142, an interior surface 144, a top lip 145, an exterior surface 146 and a lower edge 147. Housing 30 is provided with a recess 31 designed to accommodate the faceplate 140. A pair of vertical flanges 148 is located in the recess 31, one on either side of discharge chute 114, to provide a means of mounting the faceplate 140 thereon. The lateral edges 142 of the faceplate 140 are dimensioned to contact the flanges 148. In addition, the interior surface 144 of the faceplate 140 is provided with a vertical slot 150 adjacent each of the lateral edges 142 to slidingly engage the flanges 148, in the manner shown in FIG. 3. Further structural support for the faceplate 140 in the recess 31 is provided by the forward facing edges 152 of chute sidewalls 118, 120. A lower stop for the faceplate 140 is provided at 154, and the top lip 145 of the faceplate 140 seats upon the forward projecting portions 156 of housing 30.

Referring now to FIGS. 1-5, the food metering dispenser mechanism 40 and actuator will be described in greater detail. The lever 16 may take any form suitable for pets or young children, but in the preferred embodiment is provided in the form of a long bone to suggest appeal and relationship to dogs. The lever 16 is provided with a pivot end 164 and an operating end 166. The lower portion of lever 16 near its pivot end 164 cooperates at point 168 with a radiused flange 167 at the base of faceplate exterior 146 to limit its upward movement as it travels its arc generally designated by 38 (see FIG. 1). This prevents the operating end 166 from striking the food storage reservoir 22 and positions the lever 16 at an approximate 45° angle above the horizontal for easy operation and to create an operating arc 38 of approximately 90° for the dispenser mechanism 40 which it controls. The lower excursion of the lever 16 is also about 45° from the horizontal and is limited by either the lever 16 striking the substrate upon which the machine 10 is located, the base of the machine 18 and/or the paw 14 slipping off the end 166 of the lever 16. The preferred material for the lever 16 would be a medium to high density rigid urethane foam and also should be certified non-toxic, as should any coating on it.

The lever 16 follows its arc 38 in reciprocating fashion, and this reciprocating action is due to a return biasing force provided by a clock spring 170 shown most clearly in FIG. 5. In the alternative, torsion or tension springs can also be provided. The clock spring 170 is fabricated of round wire, and is strong enough to resist its own weight and return it against the drag of the food 20 on the attached hopper. The spring 170 is provided with an inner end 172 fastened by a threaded fastener 174 to the faceplate exterior 146, and an outer end 175 hooked on a projection 176 located on the inner side 178 of the lever 16. In the preferred embodiment, the projection 176 is an integral portion of the axle anchor plate 180 counter sunk into the lever 16 and secured by a plurality of threaded fasteners 181, although the plate 180 can also be insert molded into the lever 16

The lever axle 182 is integrally joined at its lever end 184 to the anchor plate 180, and is also provided with a hopper end 186 having a flattened key 188 and being internally tapped at a central bore 190. The key 188 engages a dispenser body 192 (shown in FIG. 3) at a mating key recess (not shown) to maintain an angular relationship between the lever 16 in its up position and the dispenser 40 in its closed position.

The axle 182 is inserted through the central bore 194 of the faceplate 140, which is supported by an extended boss or hub 196 to suitably engage the axle 182, provide wear resistance, and support the lever 16 with a minimum of play for a given amount of diametral clearance.

Referring now to FIGS. 3 and 4, the dispenser 40 is designed to effectively close off the entrance 126 of discharge chute in the "at rest" position of lever 16, and is principally comprised of a body 192 having a hub 198 with a central bore 199 to engage the axle 182 at one end, and, at the other end, to receive a threaded fastener 200 which secures the hopper body 192 to the axle 182 by engaging the tapped central bore 190 shown best in FIGS. 3, 4 and 5.

Referring again to FIGS. 3 and 4, the dispenser body 192 is further comprised of an "L"-shaped portion including a horizontal leg 202 integrally joined to the hub 198 and which serves as half of the product receiving portion. The vertical leg 204 of the "L" is a spring-like element which is long enough to strike and resiliently close off the discharge chute entrance 126 from above when the dispenser 40 is in the food discharge position. The vertical leg 204 is also spring-like to soften the end of the dispensing stroke of the lever 16, and to help break up the tendency of rectangular-like food particles 20 to "bridge" or clog the dispenser 40.

In the preferred embodiment, the spring-like vertical leg 204 includes a row of small coil springs 206, attached to one side of the horizontal leg 202 to form the previously described "L" The sprinqs 206 are held to the leg 202 by a cleat plate 208 under which the end coils of the springs are slid. The cleat plate 208 is held to the leg 202 by a plurality of threaded fasteners 210. The number of springs 206 used may be changed to suit the shape of the food product 20 being used.

Referring to FIG. 4, assembly of the animal food dispensing machine 10 can be accomplished by inserting the interior threaded rod 36 through the threaded passage 110 in the platform 104 of the housing 30 and securing the lower threaded end 90 of the interior threaded rod 36 within the threaded recess 88 of the central boss 86 of the base 74. A lower edge 158 of the housing 30 will then rest on the upper edge 82 of the base 74. The dispenser 40 is seated in recess 31 of housing 30. The threaded cover sleeve 44 is placed over the interior threaded rod 36 such that the lower end 112 of the threaded cover sleeve 44 (shown in FIG. 2) is secured within the threaded passage 110.

With the dispenser 40 properly seated in the recess 31 of the housing 30, a protective elastomeric gasket 160 is seated on an annular ledge 162 formed along the inner sidewall 106 of the cavity 100 in the housing 30. The container 22 is seated on the protective gasket 160 and the protective gasket 54 is placed on the top edge 56 of the container 22. The alignment apparatus 52 is positioned over the support rod 36 to engage the top edge 56 of the container 22. The retaining washer 72 then is tightened on the threaded cover sleeve 44 to secure the retainer ring 58 in place. Thereafter, the cap 24 is positioned over the support rod 36 and the assembly is completed by fastening the cap 24 on the support rod 36 by means of the screw plug 26. Of course, the sequence of the assembly of the animal food dispensing machine 10 can vary as long as the relative positions of the component parts of the machine 10 remain unchanged.

Thus, when the machine 10 is loaded with food 20, and is at rest, the lever 16 is in the "up" or closed position, with the dispenser 40 essentially closing off the discharge chute entrance 126 and positioned to receive a portion of food in the "L" formed by the horizontal leg 202 and the spring-like vertical leg 204. The lever 16 is held in the "up" position by the olook spring 170.

When an animal 12 engages the operating end 166 of the lever 16 with paw 14, and pushes the lever 16 downward to the end of the arc 38, the dispenser assembly 40 is rotated to the "discharge" position. The portion of food 20 stored in the dispenser 40 is discharged through the discharge chute 114 to exit at 138 to be available to the animal.

Once the lever 16 is released, it returns to its original position by means of the clock spring 170 to allow the dispenser 40 to reload.

The machine 10 has been described as constructed and arranged specially for operation by a domesticated animal or pet. Minor variations in size and arrangement of parts may occur to be skilled artisan without departing from the scope of the invention as set forth in the claims.

What is claimed:

1. A manually-operated food dispensing machine designed to be operated by a domestic animal comprising:
   a housing having a discharge chute with an entrance thereunto and a faceplate having interior and exterior surfaces and a central bore communicating between said surfaces, said interior surface being located adjacent to said chute entrance;
   a food storage reservoir seated upon the housing and communicating therewith;
   food metering means mounted to said interior surface and coextensive with said chute entrance to control the flow of food from said reservoir into said chute, said food metering means including a dispenser with a spring-like resilient vertical leg and a horizontal leg; and
   a reciprocating actuator mounted to said faceplate exterior surface and having means for engaging said metering means through said faceplate bore for controlling the flow of food into said chute by rotating said dispenser.

2. The animal food dispensing machine defined in claim 1 wherein said reciprocating actuator is movable in an arc between a closed position and an open chute position.

3. The animal food dispensing machine defined in claim 2 wherein said actuator is an elongate member with an axle at one end comprising said engaging means.

4. The animal food dispensing machine defined in claim 2 wherein said actuator is spring-biased to return to said closed chute positioned after movement to said open chute position.

5. The animal food dispensing machine defined in claim 1 wherein said vertical leg includes a plurality of resilient fingers arranged in a row to form a wall.

6. The animal food dispensing machine defined in claim 5 wherein each of said fingers is a coiled spring.

7. In an animal food dispensing machine designed to be operated by a domesticated animal and including a housing having a faceplate with an exterior, an interior and a central bore and a chute having an entrance, a food storge reservoir seated upon the housing and communicating therewith, a novel food metering assembly for operation by domestic animals is provided comprising:
   dispenser means for regulating the flow of food into said chute and having a spring-like resilient vertical leg and a horizontal leg, being coextensive with the entrance of said chute, and mounted to said interior of said faceplate for axial roation in said chute entrance between a first holding position and a second discharge position; and a manually operated reciprocating cantilevered actuator with an axle at one end, said actuator mounted to said faceplate exterior so that said axle passes through said bore and engages said dispenser means for rotation thereof.

8. The food metering assembly defined in claim 7 wherein said actuator is provided with a return biasing force.

9. The food metering assembly defined in claim 8 wherein said biasing force is provided by a spring.

10. The food metering assembly defined in claim 7 wherein said vertical leg of said dispenser means includes a plurality of resilient fingers arranged in a row to form a wall.

11. The food metering assembly defined in claim 10 wherein each of said resilient fingers is a coiled spring.

12. The food metering assembly defined in claim 7 wherein said faceplate is provided with actuator locking means.

13. A metering apparatus for a manually-operated animal food dispensing machine designed to be operated by a household domestic animal and having a housing with a discharge chute with an entrance, a faceplate with an interior, an exterior, a central bore and mounted to said housing so that said faceplate interior is adjacent said chute entrance, and a food storage reservoir resting upon and communicating with said housing, said metering apparatus comprising:

a dispensor means having a spring-like resilient vertical leg and a horizontal leg being coextensive with said chute entrance and mounted to said faceplate interior for axial roation in said chute entrance between a first holding position and a second discharge position; and a spring-like, reciprocating, cantilevered actuator with an axle at one end, said axle designed to pass through said faceplate bore and engage said food metering means for rotation thereof.

* * * * *